Feb. 24, 1959  W. R. AUSTIN  2,874,657
LAWN CONDITIONING TOOL
Filed March 30, 1956
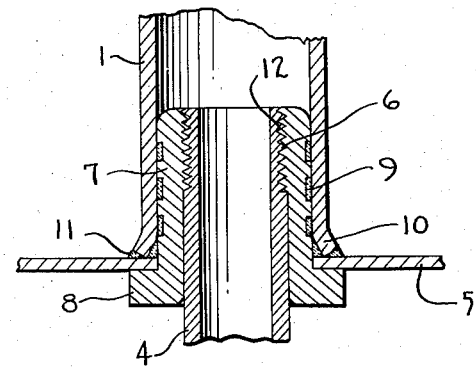
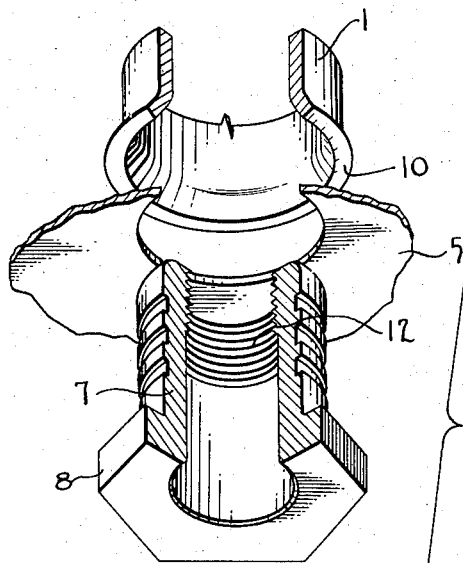
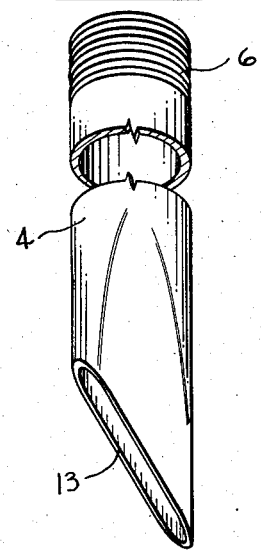
INVENTOR.
WALTER R. AUSTIN
BY
Reynolds, Beach & Christensen
ATTORNEYS

2,874,657
LAWN CONDITIONING TOOL

Walter R. Austin, Seattle, Wash.

Application March 30, 1956, Serial No. 575,177

3 Claims. (Cl. 111—7.1)

This invention relates to a lawn conditioning tool of the type illustrated in the patent to Homer O. Campbell, No. 2,172,574, dated September 12, 1939. Such a tool is attached to a source of supply of water under pressure, such as a hose, and with water discharging from the restricted nozzle at its lower end, the tool is thrust into the ground through the sod, opening a hole by the softening effect of the discharging water and the pressure of the nozzle. Not only will it subirrigate the lawn, but is will soften selected areas so that humps, bumps and hillocks may be pressed down and smoothed off.

Such a tool is used in all sorts of ground, hard and soft, and by persons of varying degrees of skill and patience. There is always the temptation on the part of the user, when the tool is slow to bore into the ground, to press down heavily upon it, rather than to press lightly and depend upon the water jet to make the hole, and in a tool equipped with a radially directed splash shield or disk, as is the tool of the Campbell patent, there is the temptation to press with the foot upon the disk, and so to urge the tool more strongly or more rapidly into the ground. This has been the cause of numerous failures and breakage in such tools, and it is a primary object of the present invention to provide a tool of the character indicated which will be more strongly built than have been such tools in the past, so that it will withstand abuse such as this in greater measure than have the former tools.

It is also an object to simplify the construction and assembly of such a tool, whereby the same may be made less expensive.

With these objects in view, and others such as will appear hereinafter, this invention comprises the novel tool shown in a preferred form in the acompanying drawings, and which will be more fully described in this specification and defined in the claims that terminate the same.

Figure 1 is an elevation of the tool in use.

Figure 2 is an axial sectional view through the assembled tool in the vicinity of the junction between the tubular handle, the nozzle, the bushing, and the disk.

Figure 3 is an exploded view, partly in section, showing the several parts of the tool in the relationship they would assume for assembly.

The tool of the present invention comprises a tubular handle 1 intended to be employed in a generally upright position, provided with means such as a coupling at 2 for the attachment of a hose 3, by means of which water under pressure can be conveyed to the tube 1 and through the tube to its lower end. At its lower end, a nozzle 4, also generally tubular, is attached so that it constitutes, in effect, a restricted continuation beneath the lower end of the tubular handle 1, so that the discharging water may bore a hole into the ground and, as the nozzle works its way into the ground, the water may be discharged beneath the surface of the ground, for the purposes indicated above. Since the water issuing from the nozzle is likely to splatter upwardly before the nozzle has bored its way into the ground, a downwardly dished disk or shield 5 is desirably mounted at the lower end of the handle 1, where the upper end of the nozzle 4 is seated in the tubular handle.

Heretofore the disk 5 has been merely seated on the end of the tube 1, and held in place primarily by a bonding agent. If the tool was carelessly handled, or if the user pressed his foot upon the disk, rather than upon the foot rest which the Campbell patent disclosed, in an attempt to force the tool more rapidly into the ground, or through ground which is not yet sufficiently bored or softened, quite often the disk would be displaced from its seat, and deformed sufficiently that parts could not be restored to their original relationship. Various expedients, usually involving more expense in making the tool, were tried in an effort to remedy this, but since the tool must be inexpensive, it has proven difficult to construct it in a manner to prevent such displacement of the disk. Moreover, pressure upon the projecting nozzle, regardless of where the pressure was applied, has had a tendency to break the nozzle just at the base of its threaded upper end at 6, where the latter has heretofore been threaded into the lower end of the tube 1. This made the tool thereafter unusable, and virtually unrepairable.

According to the present invention, these difficulties are eliminated by providing a bushing 7, having a flange or head 8 at its lower end, the bushing being of a size to fit snugly within the bore of the tube 1, within which it is held by solder or other adhesive or bonding agent indicated at 9, the bushing being held in such manner that its head 8 presses upwardly against the lower surface of the disk 5, and so presses the disk upwardly against the now flared or beiled lower end of the tube 1, as indicated at 10. The flaring spreads the bearing of the upper surface of the disk 5 against the tube's end, in contrast to the minimal area of bearing afforded heretofore by the unflared end of the thin-walled tube, and permits the disk to be firmly clamped between the flared end 10 and the head 8. It, too, may be held in place by a circle of solder or similar bonding agent, indicated at 11.

In addition, the bushing 7 is internally threaded, as indicated at 12, complementally to the threads 6, but rather than thread the entire length of the bore of the bushing 7, or only in the vicinity of its lower end as heretofore, the threads 12 within the bore of the bushing are located at the upper end of the bushing, well above the bushing's lower end. In fact, the major portion of the length of the bore of the bushing 7 is smooth or otherwise formed and of a size to embrace snugly the exterior of the nozzle 4 below its threads 6. It was found in the past that the nozzles would break off, when subjected to rough usage, at the base of the threads, where the nozzle protruded below the lower end of the tube 1 or a bushing inserted therein. Now, by locating the threaded interengagement between the bushing and the nozzle in the upper portion of the bushing, and leaving the major portion of the length of the bushing's bore smooth to embrace the nozzle 4 snugly, the nozzle is afforded good support throughout an appreciable portion of the entire length of the bushing and throughout an appreciable length of the unthreaded, hence unweakened, portion of the nozzle itself. The line of weakness at the base of the nozzle's threads is supported and stiffened, until breakage at this line is now scarcely possible.

It has been found with conditioning tools of the type described above and illustrated in the accompanying drawings, that notwithstanding moderately severe usage, the tool will still remain intact and undamaged, and will continue to function satisfactorily.

It may be noted that the exit of the nozzle 4 at its lower end, illustrated at 13, is restricted and slanted in order that the water may issue from the nozzle in a somewhat transverse direction, the better to loosen the soil around the nozzle, rather than immediately beneath it.

It is believed the manner of using the tool will be understood, namely, the nozzle tip is pressed against the ground where it is desired to subirrigate it or to soften it, and the water, loosening the soil, will permit the tool's nozzle to sink into the ground, and so to soften and perhaps wash away some of the soil in the vicinity of the nozzle. This is repeated in various spots throughout an area that needs reconditioning, until the desired result is effected. Even if some downward pressure is applied to the disk 5, the extra breadth of its engagement at 10 and at 8 will usually prevent its distortion. Sidewise pressure upon the nozzle is resisted by the bearing of the nozzle 4, below its threads 6, against the closely encircling bushing bore. The holes left upon withdrawal of the nozzle may be filled in with sand, and thus will continue to constitute effective drainage channels to permit surface water thereafter to penetrate the sod and to subirrigate the same.

I claim as my invention:

1. A lawn conditioning tool comprising a handle of a length enabling its use while standing, formed as a tube, having means for attachment of a hose, a disk fixed to and surrounding its lower end, a bushing inserted and held tightly within said lower end, the bore of said bushing being internally threaded only at its upper end, and smooth-bored from its lower end upwardly throughout the major portion of its length, and a tubular nozzle of an external diameter to fit closely within the smooth-bored lower end of the bushing, and externally threaded at its upper end complementally to the internal threads of the bushing, and threadedly interengaged therewith, for securement of the nozzle in position wherein it projects axially beyond the bushing and disk.

2. A lawn conditioning tool comprising a handle of a length enabling its use while standing, formed as a tube, having means for attachment of a hose, and flared at its lower end, a disk having a central aperture of diameter corresponding to the bore diameter of the tube, disposed with its one face in contact with and registering with the flared end of the tube, a headed bushing of an external diameter to fit snugly within the disk's aperture and the tube's bore, received and held tightly within the latter with the head of the bushing clamping the disk between itself and the flared end of the tube, to retain the disk fixed relative to the tube, a tubular nozzle externally threaded at its upper end, the bore of said bushing at its upper end only being internally threaded complementally to, and engaged with, the threaded end of the nozzle, the bore of the bushing throughout the major portion of its length, below its threads, being of a diameter to snugly embrace the nozzle below the threads on the latter.

3. A lawn conditioning tool comprising a tubular handle, of a length enabling its use while standing, having means for attachment of a hose, and flared at its lower end, a disk applied to and bearing against said flared lower end, a headed bushing inserted and held tightly within the flared end of the tubular handle, with its head bearing against the disk, at the face of the latter which is opposite the face that bears against the flared end of the tubular handle, said bushing being internally threaded at the upper end, only, of its bore, a tubular nozzle separate from and protruding beyond the lower end of the tubular handle, its upper end being externally threaded and interengaged with the internal threads of the bushing, and the bushing being smooth throughout the greater part of its length and of a bore size to snugly receive and support the nozzle, at a distance below such threaded upper end.

References Cited in the file of this patent

UNITED STATES PATENTS

| | | |
|---|---|---|
| 689,630 | Autenrieth | Dec. 24, 1901 |
| 1,175,593 | Brown | Mar. 14, 1916 |
| 1,732,279 | Reimers | Oct. 22, 1929 |
| 1,888,338 | Weatherhead | Nov. 22, 1932 |
| 2,027,005 | Tatroe | Jan. 7, 1936 |
| 2,172,574 | Campbell | Sept. 12, 1939 |
| 2,580,818 | Mundy et al. | Jan. 1, 1952 |

FOREIGN PATENTS

| | | |
|---|---|---|
| 113,891 | France | Mar. 23, 1877 |
| | (Addition to No. 113,891) | |